Sept. 9, 1941.   V. S. ROBINSON ET AL   2,255,189
SPRAYING APPARATUS FOR CEMENT, PAINTS, AND OTHER LIQUIDS AND SUBSTANCES
Filed July 22, 1937   4 Sheets-Sheet 1

INVENTORS
Victor Snow Robinson
Eric Victor Robinson
BY
ATTORNEY

Sept. 9, 1941.  V. S. ROBINSON ET AL  2,255,189
SPRAYING APPARATUS FOR CEMENT, PAINTS, AND OTHER LIQUIDS AND SUBSTANCES
Filed July 22, 1937  4 Sheets-Sheet 3

INVENTORS
Victor Snow Robinson
Eric Victor Robinson
BY
A. Knight Cowas
ATTORNEY

Sept. 9, 1941.  V. S. ROBINSON ET AL  2,255,189
SPRAYING APPARATUS FOR CEMENT, PAINTS, AND OTHER LIQUIDS AND SUBSTANCES
Filed July 22, 1937   4 Sheets-Sheet 4

Patented Sept. 9, 1941

2,255,189

UNITED STATES PATENT OFFICE 2,255,189

SPRAYING APPARATUS FOR CEMENT, PAINTS, AND OTHER LIQUIDS AND SUBSTANCES

Victor Snow Robinson and Eric Victor Robinson, Wallington, England

Application July 22, 1937, Serial No. 154,954
In Great Britain July 22, 1936

4 Claims. (Cl. 91—45)

This invention relates to spraying apparatus and although primarily concerned with the spraying of cement, is nevertheless applicable to the spraying of oil or cellulose paint or other liquids or substances.

It is the present practice when spraying cement by means of a cement gun to mix the cement together with a suitable aggregate if required in a suitable container, water being fed into the container for the purposes of hydration, the cement, aggregate and water being intimately mixed together either by means of mechanical agitators or alternatively by the injection of air into the mixture. The surface of the mixture is subjected to air pressure from a suitable source of air supply, the mixture being thus ejected from the container and sprayed on to the wall or other surface to be treated. It is found in practice that this method has distinct disadvantages. In the first case hydration of the cement when within the container is unsatisfactory as the particles of cement and particularly the heavy particles of aggregate tend to fall to the lower end of the container despite the action of the agitator, and furthermore, the mixture contains a large proportion of occluded air which is deposited in the coatings on the wall or other surface as is shown by small pock marks and minute holes in the coatings, which are therefore not watertight, and, in cases where pneumatic agitation is used, the occlusion of air in the mixture is enhanced. Porosity due to the occlusion of air is one of the most serious defects in all present systems of cement and paint spraying. A further reason why occluded air is always present in the coatings deposited is due to the fact that considerable air pressure has to be imposed on top of the mixture in order to force it through the pipes and spraying nozzle or gun, the air when in the mixture being in a substantially dissolved state but subsequently resumes its normal condition in the form of small air bubbles in the coatings after their application. Further disadvantages of this method are that the mixture tends to set in the container and thus it is difficult to atomise the wet mixture owing to its varying viscosity. A further disadvantage from a practical and commercial view point is that all the parts of the apparatus are subjected to such abrasive and erosive action that they are quickly damaged or destroyed and there is a tendency for the whole of the apparatus to become choked and clogged.

The object of the present invention is to eliminate the above mentioned disadvantages by a form of apparatus in which the dry cement and the water are kept separate until such time as they shall both have been discharged from the spraying apparatus in a finely divided state and to bring the particles of cement and water into intimate contact with each other and become perfectly admixed as or just prior to the admixture being deposited on the surface to which it is desired to apply the coating of cement.

The invention in its broadest aspect consists in intermingling a cloud of particles of cement or other substance with a cloud composed of particles of water or other liquid after leaving the spraying apparatus, the mixture of the substance with the liquid, or in the case of cement spraying, the hydration of the cement, thus taking place practically in situ.

The cement with or without a suitable aggregate or alternatively some other substance is directed from the nozzle of the apparatus under pressure and thus emerges from the nozzle in the form of a cloud, the liquid, such as, for example water, being atomised and emerging at a pressure above that of the atmosphere from a further nozzle, or alternatively from an orifice or orifices associated with the main cement or other substance supplying nozzle, the liquid being under pressure (above atmospheric pressure) and emerging from the nozzle or orifice in the form of a cloud which intermingles with the cloud of cement or other substance just prior to or at the point of impact with the wall or other surface being coated. In this way a substantially perfect intermixing of the particles of the substance and the particles of the liquid takes place and consequently in the case of cement spraying hydration is almost perfect, whilst there is no possibility of premature setting of the cement as in the case in which hydration takes place within the mixing container.

In the accompanying drawings which illustrate this invention—

Figure 1:
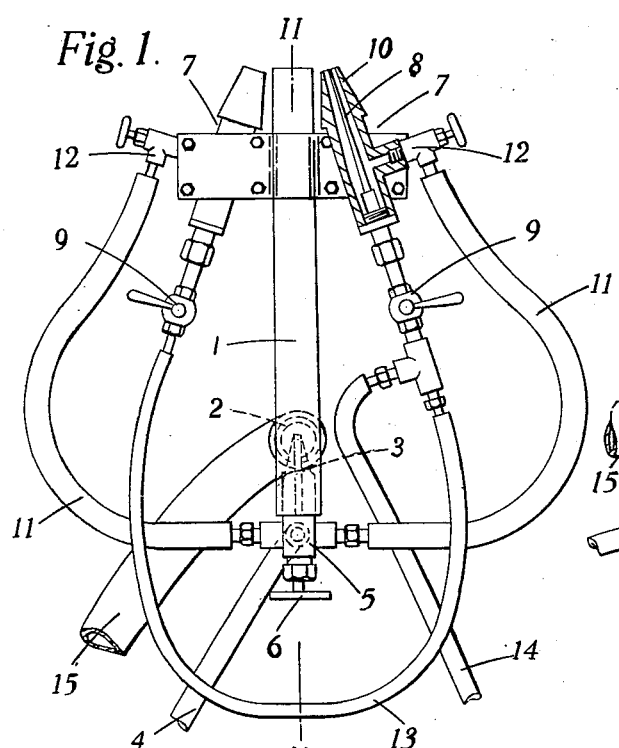
Figure 1 is a plan, partly in section, of one form of spray gun constructed according to the present invention.
Figure 2:
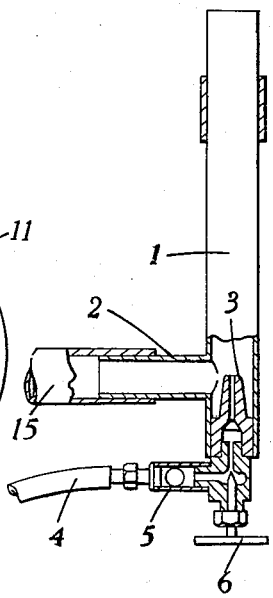
Figure 2 is a section on the line II—II of Figure 1.

The spray gun illustrated in Figures 1 and 2 comprises a centrally disposed tube 1 through which solid material in a finely divided state is ejected after being drawn up through a branch or feed tube 2 under the action of a solids ejector nozzle 3 secured within the lower end of the tube 1. The ejector nozzle 3 receives compressed air through a flexible pipe 4, cross piece 5 and regulating valve 6. Two liquid atomising nozzles 7 are arranged one on each side of the tube 1 in one plane therewith and angularly disposed so that they are directed to a common focal point on the axis of the tube 1. Each of said nozzles 7 comprises an inner nozzle 8 arranged to be supplied with liquid through a cock 9 and a concentric outer tube member 10 forming an annular nozzle to which compressed air is supplied from the cross piece 5, flexible pipe 11 and regulating valve 12. The cocks 9 controlling the supply of liquid may be interconnected by the pipe 13 and supplied with liquid through the pipe 14 as shown, or they may each be supplied with liquid through independent pipes, as will be readily understood.

When employed for spraying cement the gun is connected to a suitable source of compressed air by the pipe 4 to a supply of water under pressure by the pipe 14 and to an apparatus (hereinafter described and called a mixing barrel) arranged to supply a suspension of cement in air by hose 15; the valves 9 and 12 are then opened and regulated to obtain two converging jets or sprays of atomised water, the air valves 12 being preferably opened before the liquid valves 10 in order to prevent dribbling of the liquid. On opening the regulating valve 6 an ejector action will be set up at the junction of the tubes 1 and 2 thereby sucking a cloud of cement through the hose 15 and ejecting same through the tube 1 to meet the sprays of atomised water substantially at a common focal point. The gun is held so that the surface to be coated with cement is at, or just beyond, said focal point so that the intermingling of the cement and water particles or the hydration of the cement takes place practically in situ.

Figure 3:
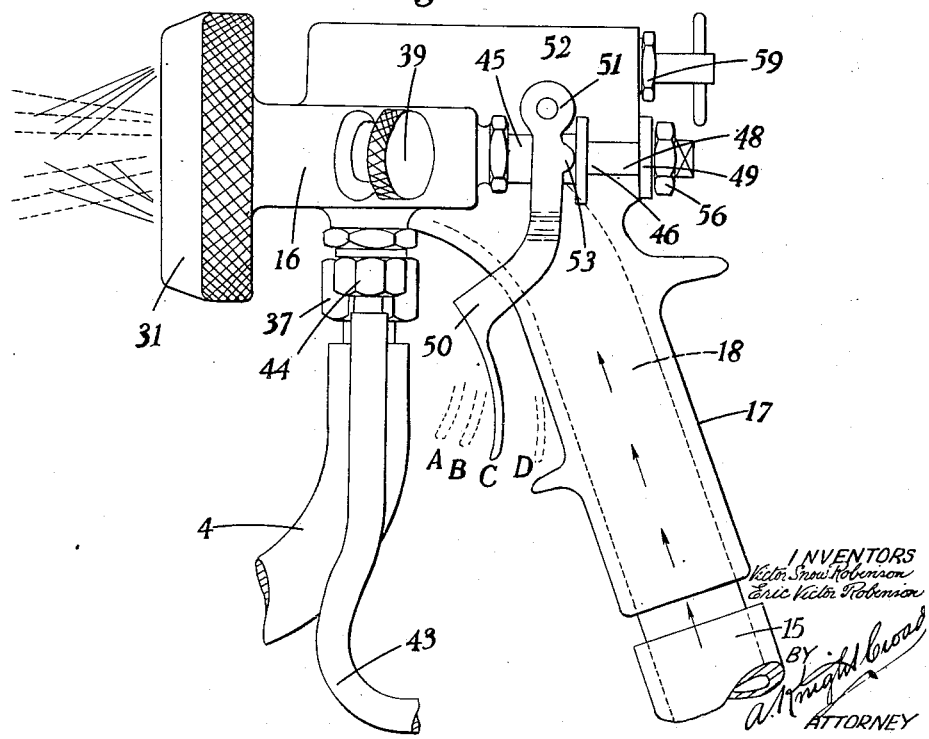
Figure 3 is a more or less diagrammatic side elevation of a modified form of spray gun constructed according to the present invention.
Figure 4:
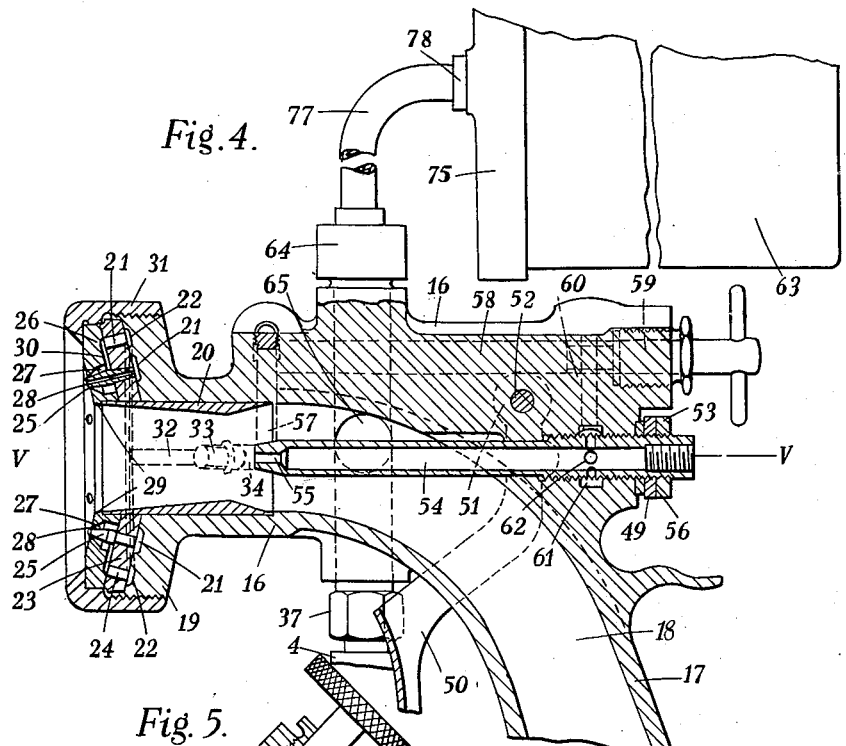
Figure 4 is a central longitudinal vertical section of a type of gun illustrated in Figure 3 showing also, but in elevation, a dry colour pot attached to the gun.
Figure 5:
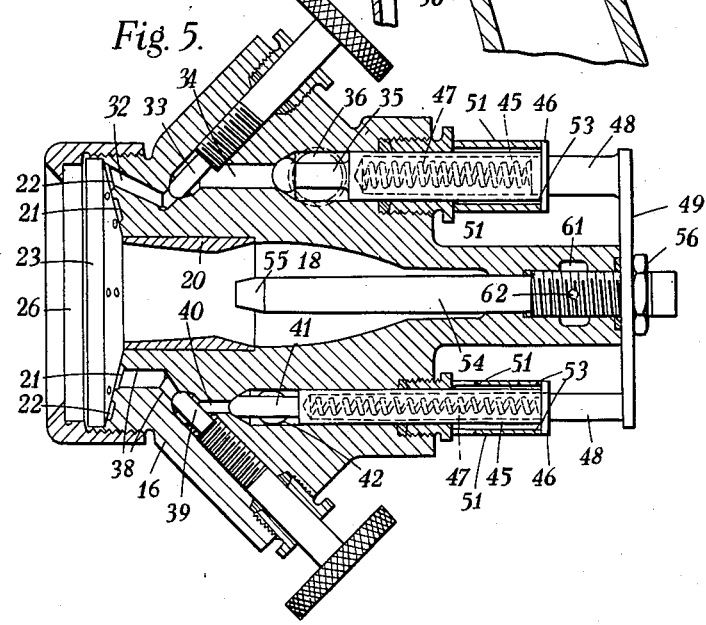
Figure 5 is a section on the line V—V of Figure 4.

The preferred embodiment of spray gun illustrated in Figures 3, 4 and 5 consists of a casting 16 formed essentially as a curved tube, the lower part 17 of which constitutes a hand grip. The main bore 18 for the passage of the finely divided solids extends from said hand grip part 17 to the front end of the casting 16 which terminates with an enlarged or flared part 19, the end of the bore 18 being fitted with a choke tube 20. The front face of the flared part 19 is provided with inner and outer concentric grooves 21 and 22 respectively, and arranged to fit over the projecting end of the choke tube 20 and seat against said face is a coned washer member 23 provided with two series of concentrically disposed apertures 24 arranged to communicate with the grooves 21 and 22 in the part 19; each aperture of the inner series communicating with the grooves 21 is fitted with a nozzle 25 sweated or otherwise secured therein. A further coned washer member 26 is arranged to seat against the outer face of the coned washer member 23, said member being furnished with a plurality of conical holes 27 corresponding in position and number with the number of nozzles 25, the outer ends of which are arranged to project slightly through said conical holes so as to leave an annular passage or nozzle 28. The coned washer member 26 is provided with an inwardly projecting flange 29 adapted to prevent endwise movement of the choke tube 20 within bore 18, and also on its rear face with an annular groove 30 adapted to place each of the conical holes 27 in the member 26 into communication with the holes 24 in the coned member 23, and with the annular groove 22 in the face of the part 19. The coned washer members 23 and 26 are held firmly against one another and against the face of flared part 19 of the casting by means of a screwed ring 31 and the conicity of said members is such that each double nozzle 25, 28 is directed towards a common focus some two or three inches in front of and on the axis of the choke tube 20. The outer annular groove 22 and consequently the annular nozzles 28 receive compressed air through a passage 32, screw-down regulating valve 33, passage 34, spring closed valve 35 and vertical passage 36 to the lower end of which is connected a flexible compressed air supply pipe 4 by means of a union 37. The inner annular groove 21 and consequently the nozzles 25 receive liquid through a passage 38, screw-down regulating valve 39, passage 40, spring closed regulating valve 41 and vertical passage 42, to the lower end of which is connected a flexible liquid supply pipe 43 by means of a union 44. The air and liquid regulating valves 35 and 41 respectively are each furnished with a hollow plunger portion 45 provided on its outer end with a collar 46 adapted to contain a spring 47, the ends of which bear against the inner end of the hollow plungers 45 and against the ends of rods 48 slidable in said plungers whereby the valves are maintained on their respective seats; the opposite ends of the rods 48 are secured to a fixed yoke 49. The valves 35 and 41 are controlled by a forked trigger member 50; the end of each arm is bifurcated to form figures 51 adapted to embrace the plunger portions 30, said fingers being pivoted to the casting 16 and 52. The fingers 51 are each provided with a cam 53 adapted to bear against the collars 46 on each side of the plunger. The cams adapted to operate the air valve 35 are slightly larger or in advance of the cams 53 adapted to operate the liquid valve 41.

Disposed coaxially with the choke tube 20 is a tube 54; the front end of said tube 54 terminates just within the said choke tube and is formed as a nozzle 55 hereinafter termed the ejector nozzle. The tube 54 is screwed into the casting from the rear, the plugged outer end serving, by means of a nut 56, to secure the yoke 49 to the casting 16. The ejector nozzle 55 is supplied with compressed air from the passage 34 through a transversely inclined passage 57, longitudinal passage 58, plug cock 59, vertical passage 60, annular space 61 and holes 62 in the tube 54.

Figure 6:
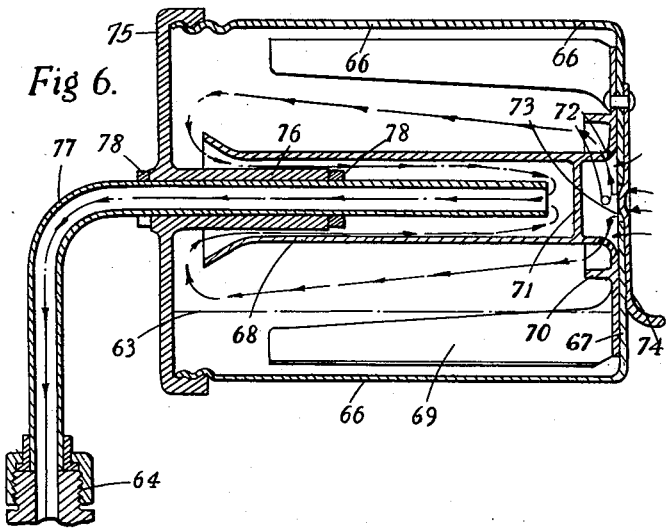
Figure 6 is a central longitudinal section of the dry colour pot illustrated in Figure 4.

A colour pot (Figure 6) is detachably connected to the top of the gun by means of a pipe union 64 through which the said pot is put into communication with the main bore 18 through a vertical passage 65 in the casting 16.

The colour pot consists of a cylindrical metal container or pot 66 to the base 67 of which is secured a centrally disposed tube 68, radially disposed longitudinal blades 69 and a guard ring 70, the said tube 68 being locked at 71 and provided with outlet holes 72 close to the base 67. Said container has a central aperture 73 in the base 67 closable by means of a sliding cover 74 and the open end of said container is closed by a lid member 75 provided with a centrally disposed sleeve 76 revolubly mounted on a horizontal portion of a right angled pipe 77 connected to the pipe union 64, endwise movement of the sleeve 76 on the pipe 77 being prevented by collars 78 secured to said pipe.

Figure 7:
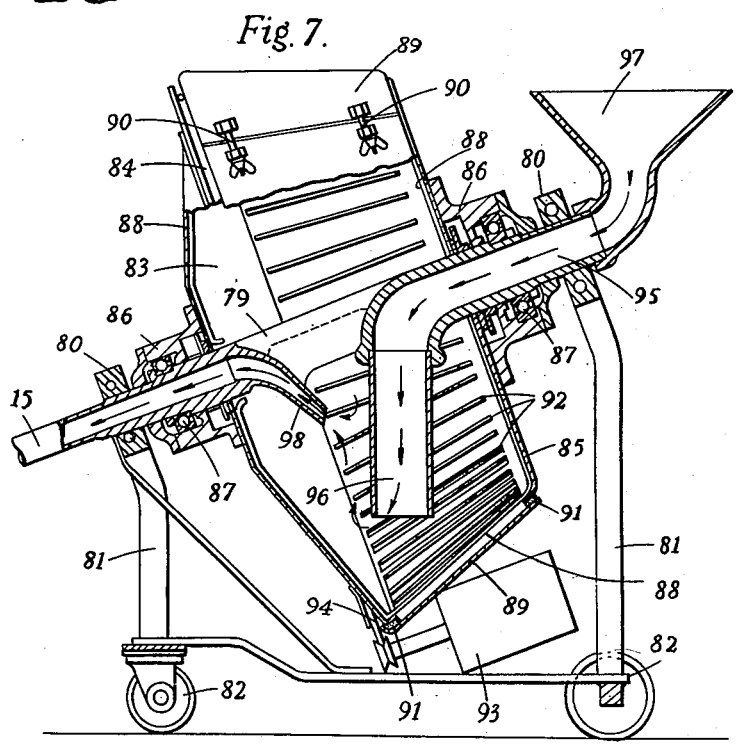
Figure 7 is a central longitudinal vertical section of one embodiment of a mixing barrel.

Finely divided solid matter such as cement is sucked from a mixing barrel through a flexible hose 15 attached to the lower end of the hand grip 17 and through the main bore 18 of the gun by the action of the ejector nozzle 55. One form of mixing barrel suitable for supplying said solid matter in a cloud-like form is illustrated in Figure 7 and comprises a non-rotatable main shaft member 79 detachably secured by clamps 80 to a frame 81 mounted on wheels 82. The barrel proper 83 consists of a coned member 84 and a smaller oppositely disposed flat disc member 85 each secured to bosses 86 mounted upon ball bearings 87 on the fixed shaft 79, said members being reinforced and connected at their peripheries by two diametrically disposed flat strips 88 and a detachable conical casing 89 consisting of two semi-circular halves hinged together and arranged to be securely clamped around the end members 84 and 85 by means of eye-bolt devices 90. The joint between said casing and the said members 84 and 85 being preferably made with felt strips 91, the casing 89 is provided with a number of inwardly and radially projecting longitudinal blades 92 and the complete barrel 83 is arranged to be rotated by a pneumatic electric or other suitable motor 93 secured to the frame 81 and belt drive 94 or in any other convenient manner. As shown, the fixed shaft 79 is disposed at an angle and consists of a casting comprising hollow end portions both communicating with the interior of the barrel 83. The hollow upper portion 95 through which the matter to be mixed is charged into the barrel, opens vertically downwards into said barrel and is provided with a tubular extension 96 so as to depend into or foul the substance in the barrel when same is sufficiently charged. The upper end of the portion 95 of the shaft is furnished with a charging funnel 97. The hollow lower end portion of the fixed shaft 79 to which the end of the hose 15 is attached, is of smaller diameter than the portion 95 and terminates in the interior of the barrel in a downwardly directed collecting nozzle 98 having a horizontally disposed narrow slit-like opening of fan-shaped formation in plan.

Figure 8:
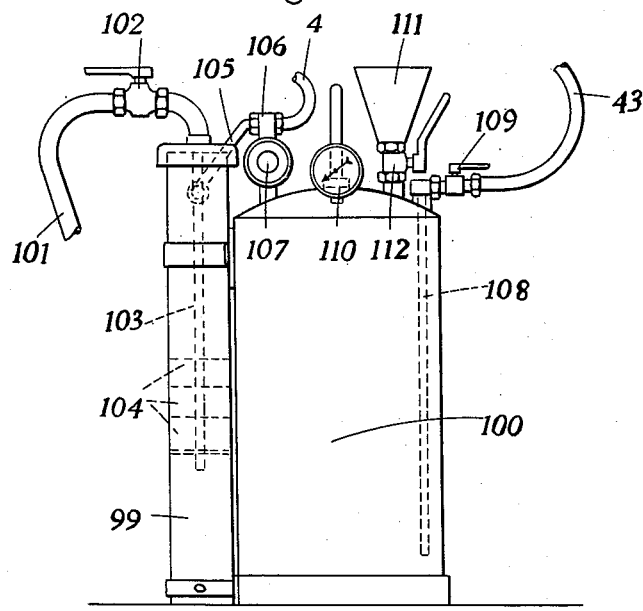
Figure 8 is a side elevation of one embodiment of air purifier and liquid container unit, and, Figure 9 is a diagrammatic view, partly in section, of a modified form of liquid container.

The flexible pipes 4 and 14 for supplying compressed air and liquid described as connected to the spraying device, are connected at their opposite ends of the air and liquid supply unit illustrated in Figure 8 comprising an air purifier 99 and a liquid container or drum 100. Compressed air from a suitable compressor is fed through the pipe 101 and cock 102 to the top of pipe 103 which depends substantially to the bottom of the cylindrical casing 99 of the purifier. Oil and water or other relatively heavy impurities will tend to fall to the bottom of the casing 99 where they can be blown off as required through a suitable drain cock. The compressed air then forces itself upwardly through suitable cleaning elements or filters 104 and is led by a pipe 105 to a T-piece 106, one leg of which serves for the attachment of the air supply hose 4, whilst the other supplies air through a reducing valve 107 to the top of the liquid container 100, thereby exerting a pressure on the surface of the contained liquid forcing same up through a pipe 108 provided with a shut-off cock 109 to which the liquid supply pipe 14 is attached. A gauge 110 gives visual indication of the pressure in the container 100, said pressure being regulated by the valve 107 according to the height of the gun above the liquid container, and a funnel 111 provided with a cock 112 enables the said container to be readily filled or replenished.

Assuming it is desired to deposit a coating of cement or paint by means of the apparatus described with reference to Figures 3 to 7, the first step is to charge the mixing barrel 83 and liquid container 100. When depositing cement the mixing barrel 83 would be charged with cement or a combination in suitable proportions of cement and aggregate and/or pigment in powdered form and the liquid container 100 with water for hydrating the cement, whilst for depositing paint the mixing barrel would be filled with pigment in powdered form and the liquid container with a suitable solvent for the pigment. The motor 93 is then started thereby causing the barrel 83 to rotate; the solids therein, carried around the shell of the barrel by the blades 92, fall as a stream when they approach the top, this action forming said solids into a cloud or miniature sand-storm in the barrel.

If the cock 102 controlling the compressed air supply to the air purifier and liquid container unit is now opened, the gun will be supplied with compressed air and liquid through the pipes 4 and 14 respectively, and, by regulating the valves 33, 39 and 59 according to the nature of the materials employed and the surface to be treated, the gun is ready for operation. The gun is then directed towards the surface to be coated so that the focal point of the various nozzles is at or close to the said surface and the trigger 50 gently pressed, the successive action of which will be described with reference to the approximate dotted and full line positions A, B, C and D (Figure 3). The cams 53 touch the collar 46 of the air valve 35 when the trigger is in the position A, thereby causing air to be admitted to the valve 33 and hence to the annular nozzles 28. Upon the trigger reaching position B the corresponding cams touch the collar 46 of the liquid valve 41 and admit liquid to the valve 39 and thence to the nozzles 25 at each of which it is atomised by the cone of air issuing from the surrounding annular nozzle 28. The reason for causing the air to be turned on first is to ensure that no liquid dribbles down the face of the coned washer member 26 which would result in solids sticking thereon. When the trigger 50 arrives at position C the air supply valve 35 is arranged to be at about half its stroke, at which position sufficient air is supplied to the ejector nozzle 55 to commence the solids ejector action, further movement of the trigger 50 merely increasing said ejector action until a maximum or final position is reached at D. It has been found in practice that owing to the varying nature of the surfaces to be coated it is necessary to control the supply of solids for which purpose cock 59 can be set to fix the supply of air to the ejector nozzle 55 but its principal use in practice is to cut off the air supply to the ejector nozzle completely and so stop the solids ejector action when the latter is not required. The atomising air jets or the liquid jets may also be independently regulated or completely shut off by means of their respective regulating valves 33 and 39 making it possible therefore to discharge compressed air, liquid or solids from the gun independently.

The mixing barrel 83 may be charged with solid material whilst rotating and whilst the gun is in action through the funnel 97, thereby enabling the gun to be operated without interruption, the inclination of the main shaft 79 causing said material to slide by gravity into the interior. If the barrel 83 is overcharged the solids in the bottom thereof will foul the pipe 96 and if driven by a pneumatic motor will exert a braking effect on the barrel, slowing it down and so warning the operator that the charge is sufficient. If an electric motor were employed as the driving motor 93, the scale of an ammeter recording the motor current could be marked at the current value reached at the commencement of the said braking effect.

Cement, coloured solid matter or pigment may, instead of being fed from or mixed with the solids in the barrel 83, be fed from the colour pot, the container 66 being filled therewith up to about the height of the blades 69 as shown by the broken line 63 and is then revolved by hand to form the pigment into a cloud in a similar manner to the mixing barrel 83. Operation of the gun in the manner above described will cause air, and with it the so formed cloud of pigment, to be sucked through the pot in the directions indicated by the arrows, into the main bore 18 of the gun where the pigment or cement will intermingle with the solids from the mixing barrel 83. A number of containers 66 each filled with a different pigment may be kept at hand ready to be interchanged by unscrewing them from the lid member 75 and the feed can be interrupted when desired by closing the aperture 73 by means of the cover 74 thereby preventing air from being drawn into the pot. The purpose of the guard ring 70 is to prevent solid matter dropping into the holes 72 and fouling same.

The colour pot is primarily intended to be used for spraying coloured pigments on uncoloured coatings of cement as by this method efflorescence is prevented.

Figure 9:
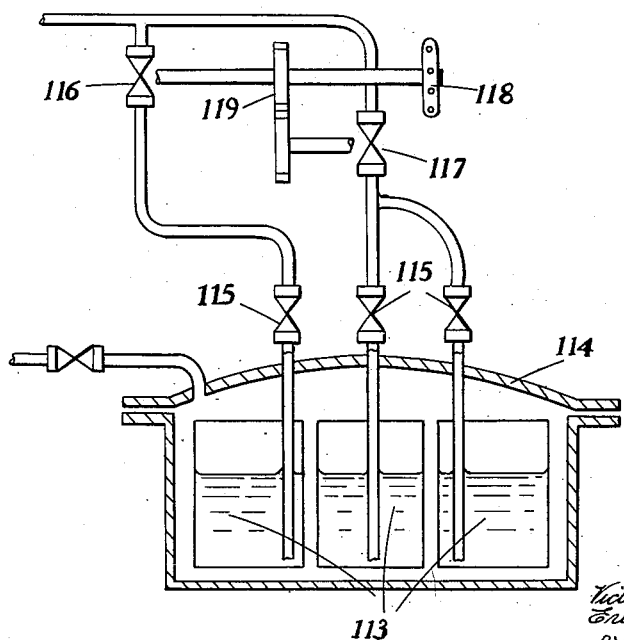

Colour may, if desired, be introduced by filling the liquid container 100 with coloured liquid. Moreover more than one container 100 or a number of separate vessels enclosed within a single pressure container each having an independent outlet pipe 108 may be employed, each of said vessels being filled with liquid of a different colour; for example, as shown in Figure 9, three inner vessels 113 may be arranged within a container 114, each of said vessels containing one of the three artistic primary colours and by means of three cocks 115 located in the outlet pipes any desired combination or mixture of the three primary colours may be obtained. A control enabling a range of colours to be obtained consists of a cock 116 in the outlet pipe of one of the liquid colour pots 113, a cock 117 in a common outlet pipe from the remaining two liquid colour pots 113 and a hand wheel 118 arranged to operate the said cocks 116 and 117 differentially by means of gearing 119. Thus colour from the independently controlled pot could be mixed in any desired proportion with colour from one or other of the remaining two pots, obtaining, for example, any desired shade of green by the admixture in varying proportions of yellow and blue.

The primary use of the present invention is for spraying a coating of cement or cement and aggregate upon a surface, in which case the mixing barrel 83 would be filled with cement or cement and fine aggregate and the liquid container 100 with water. The stream of finely divided cement issues from the nozzle and remains dry until it passes through the focus of the jets of atomised water whereupon the cement is hydrated and immediately deposited upon the surface to be coated. The surface may then, if desired, be rippled by use of the air jets alone and may be coloured by blowing dry pigment thereon from the colour pot.

As previously mentioned, however, the apparatus may be employed for spraying paint, in which case the pigment would be placed in the mixing barrel 83 and/or colour pot 66 and the solvent, and if required, a drier in the liquid container 100.

What we claim is:

1. Apparatus for spraying solids comprising in combination a gun having a centrally disposed main bore, a choke tube disposed within the nozzle end of said main bore, an ejector nozzle disposed coaxially within and to the rear of the choke tube, means for supplying a cloud of finely divided solid material to said main bore, a plurality of liquid atomising nozzles disposed concentrically around the forward end of the nozzle of the main bore, and directed to a common focal point in front of the gun on the axis of said main bore, means for supplying air to said liquid atomising nozzles, means for supplying air to the ejector nozzle, means for regulating the air supply, means for regulating the liquid supply, a trigger on said gun provided with means adapted to coact with said air and liquid regulating means.

2. In apparatus for spraying solids the combination of a nozzle from which a cloud of solid particles is emitted, a choke tube disposed within said nozzle, an ejector nozzle disposed within and to the rear of the choke tube for effecting the emission of said cloud, and a plurality of liquid atomising nozzles each comprising an inner nozzle supplied with liquid and an outer nozzle supplied with compressed air, the inner nozzles being secured in and projecting from the outer concave face of a coned washer member and extending into a second and similar coned washer member disposed against and in front of the first named coned washer member so as to leave an annular space constituting the outer nozzles around each inner nozzle, the various nozzles being directed substantially to a common focal point in front of and away from the solids nozzle around which they are concentrically disposed.

3. In apparatus for spraying solids, the combination of a nozzle from which a cloud of solid particles is emitted, a choke tube disposed within said nozzle, an ejector nozzle disposed within and to the rear of the choke tube for effecting the emission of said cloud, a plurality of liquid atomising nozzles directed substantially to a common focal point in front of and away from the first named nozzle around the forward end of which they are equally spaced and concentrically disposed, a regulating valve and spring pressed valve for controlling the liquid supply, a spring pressed valve for controlling the air supply, a regulating valve in the branch air supply to the liquid atomising nozzles, a regulating valve in the branch air supply to the ejector nozzle and a single trigger for operating both spring pressed valves.

4. In apparatus for spraying solids, the combination of a nozzle from which a cloud of solid particles is emitted, a choke tube disposed within said nozzle, an ejector nozzle disposed within and to the rear of the choke tube for effecting the emission of said cloud, a plurality of liquid atomising nozzles directed substantially to a common focal point in front of and away from the first named nozzle around the forward end of which they are equally spaced and concentrically disposed, a regulating valve and spring pressed plunger valve for controlling the liquid supply, a regulating valve and a spring pressed plunger valve for controlling the air supply to the liquid atomising nozzles, a regulating valve in the branch air supply to the ejector nozzle, a forked trigger pivotally mounted on the body of the apparatus, a bifurcated end to each arm of said forked trigger forming fingers adapted to embrace a part of the spring pressed plunger valves, a collar on each of said plunger valves, and a cam on each of said fingers adjacent the ends thereof adapted to coact with said collars when the trigger is actuated so that the air supply valve is opened in advance of the liquid supply valve and the latter in advance of the ejector action of the ejector nozzle.

VICTOR SNOW ROBINSON.
ERIC VICTOR ROBINSON.